(12) United States Patent
Messias et al.

(10) Patent No.: US 11,162,329 B2
(45) Date of Patent: Nov. 2, 2021

(54) DIRECT TIE-IN METHOD

(71) Applicants: TECHNIP FRANCE, Courbevoie (FR); TECHNIP UK LTD, London (GB)

(72) Inventors: Nicolas Messias, Lysaker (NO); Richard Jansen, Lysaker (NO); Michael Boubli, Lysaker (NO); Stein Rune Rasmussen, Asker (NO); Eric Davanture, Asker (NO); Danone Ryan Bauknight, Lysaker (NO); Eric Waymel, Lysaker (NO)

(73) Assignees: TECHNIP FRANCE; TECHNIP UK LTD

( * ) Notice: Subject to any disclaimer, the term of this patent is extended or adjusted under 35 U.S.C. 154(b) by 0 days.

(21) Appl. No.: 16/062,759

(22) PCT Filed: Dec. 21, 2016

(86) PCT No.: PCT/IB2016/001975
§ 371 (c)(1),
(2) Date: Jun. 15, 2018

(87) PCT Pub. No.: WO2017/109579
PCT Pub. Date: Jun. 29, 2017

(65) Prior Publication Data
US 2020/0032619 A1 Jan. 30, 2020

(30) Foreign Application Priority Data
Dec. 22, 2015 (GB) ...................................... 1522600

(51) Int. Cl.
*E21B 43/013* (2006.01)
*E21B 41/00* (2006.01)
(Continued)

(52) U.S. Cl.
CPC ...... *E21B 41/0007* (2013.01); *E21B 43/0135* (2013.01); *F16L 1/16* (2013.01); *F16L 1/23* (2013.01); *F16L 1/26* (2013.01)

(58) Field of Classification Search
CPC ............... E21B 43/013; E21B 43/0135; E21B 41/0007; F16L 1/16; F16L 1/26
See application file for complete search history.

(56) References Cited

U.S. PATENT DOCUMENTS 3,658,366 A    4/1972  Welch, Jr. et al. ............. 285/24
3,744,258 A *  7/1973  Lochridge ............ B23K 9/0061
                                                    405/169
(Continued)

OTHER PUBLICATIONS

International Search Report dated May 15, 2017 in corresponding PCT International Application No. PCT/IB2016/001975.
(Continued)

*Primary Examiner* — Sean D Andrish
(74) *Attorney, Agent, or Firm* — Ostrolenk Faber LLP

(57) ABSTRACT

A method of positioning an end of a pipeline on a subsea structure includes the steps of: (a) providing a channel on the subsea structure, the channel having an open end adjacent to a receptacle on the subsea structure, (b) providing a pipeline, (c) attaching a connector to an end of the pipeline, (d) laying the end of the pipeline with the connector attached into the channel, and (e) pulling the pipeline end along the channel such that the connector exits the open end of the channel and is received by the receptacle. A channel is used in the method and a subsea structure is used wherein the channel is provided on the upper surface of the subsea structure.

5 Claims, 10 Drawing Sheets

(51) Int. Cl.
  *F16L 1/16* (2006.01)
  *F16L 1/23* (2006.01)
  *F16L 1/26* (2006.01)

(56) References Cited

U.S. PATENT DOCUMENTS

| | | | | |
|---|---|---|---|---|
| 4,225,270 | A * | 9/1980 | Dareing | E21B 43/0135 |
| | | | | 405/168.1 |
| 5,501,549 | A * | 3/1996 | Breda | E21B 41/04 |
| | | | | 405/169 |
| 6,910,830 | B2 | 6/2005 | Endal | 405/158 |
| 2007/0269270 | A1 | 11/2007 | Bastesen et al. | 405/170 |
| 2008/0014026 | A1* | 1/2008 | Routeau | E21B 43/0135 |
| | | | | 405/224.2 |
| 2012/0298245 | A1* | 11/2012 | Dupre | F16L 1/26 |
| | | | | 138/106 |
| 2013/0146301 | A1 | 6/2013 | Lugo | 166/344 |

OTHER PUBLICATIONS

Written Opinion dated May 15, 2017 in corresponding PCT International Application No. PCT/IB2016/001975.
Combined Search and Examination Report dated Jul. 13, 2016 in corresponding United Kingdom Patent Application No. 1522600.4.
P.R. Nystrøm et al., "Lay Method to Allow for Direct Tie-in of Pipelines," Jun. 26, 2015; Retrieved from the Internet: URL:http://www.isope.org/publications/proceedings/ISOPE/ISOPE 2015/papers/15TPC-0930Nystrom.pdf, pp. 164-174, (retrieved on May 2, 2017).

* cited by examiner

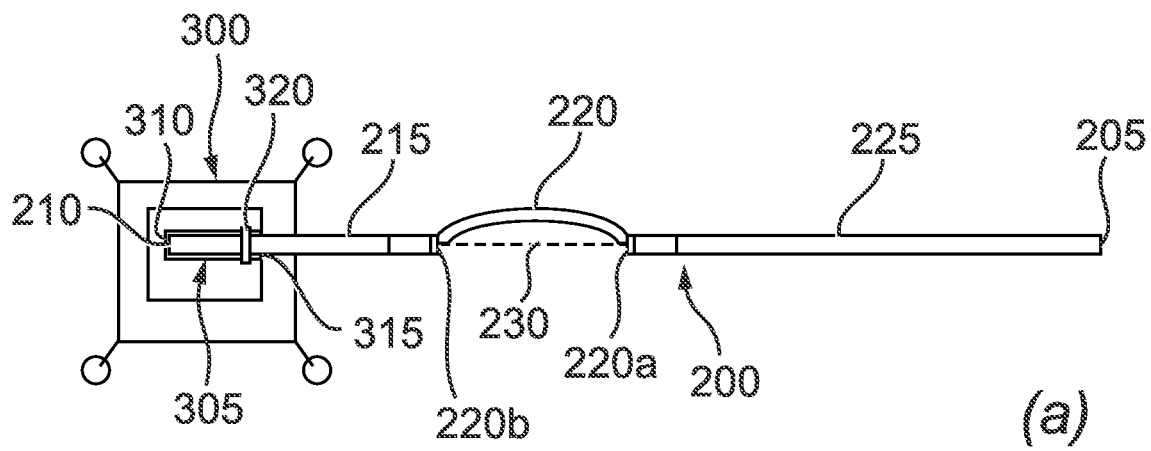
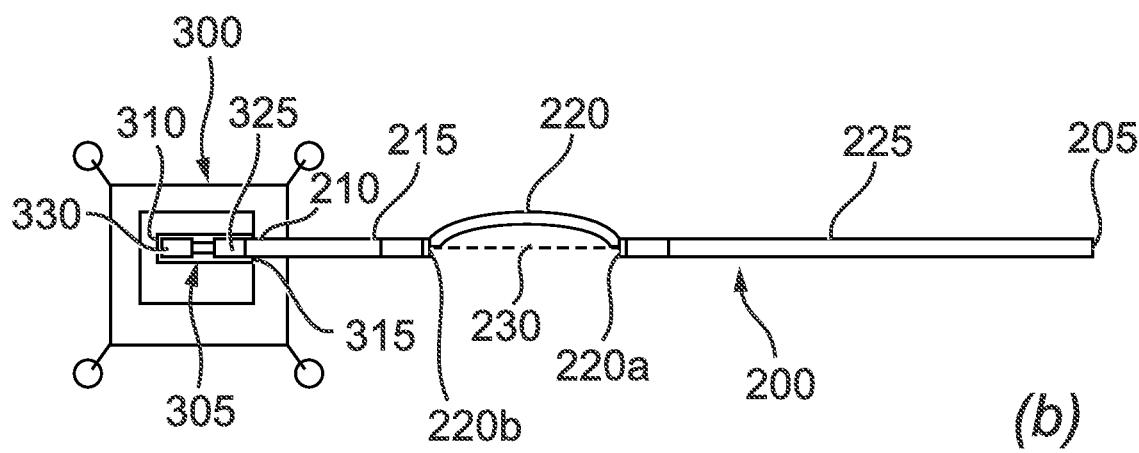
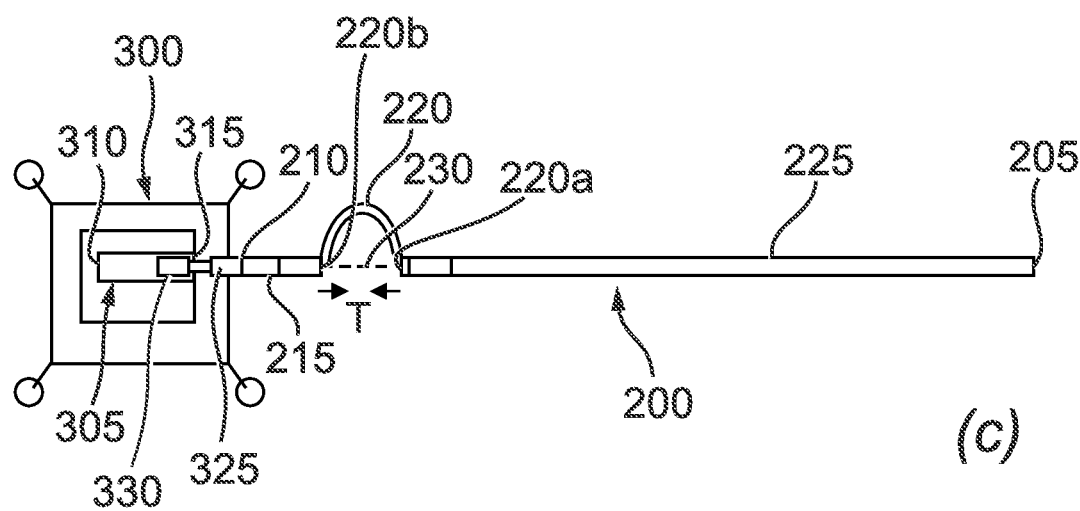
Fig. 5

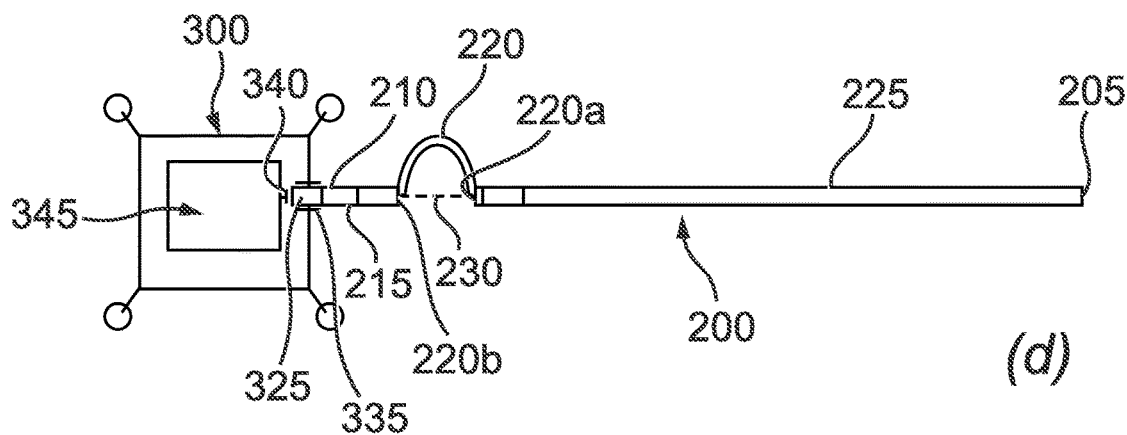
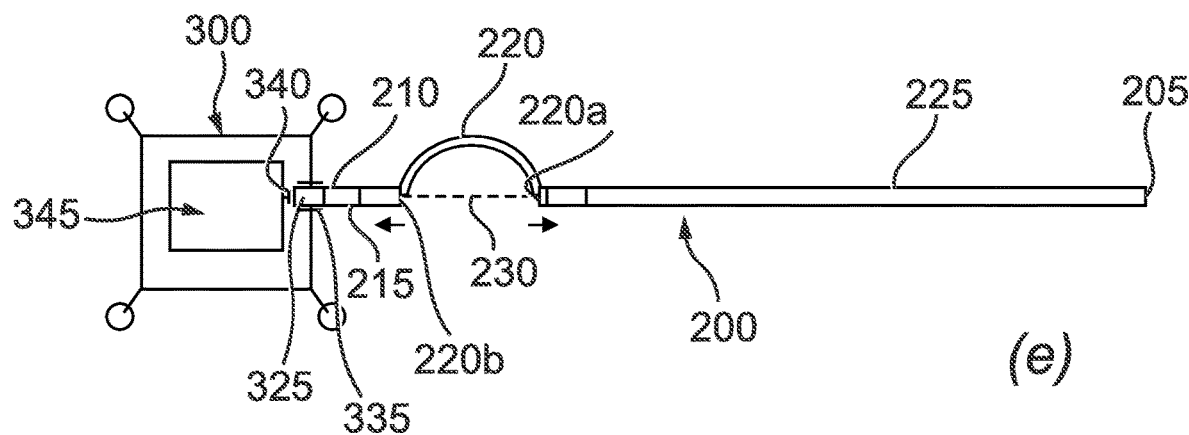
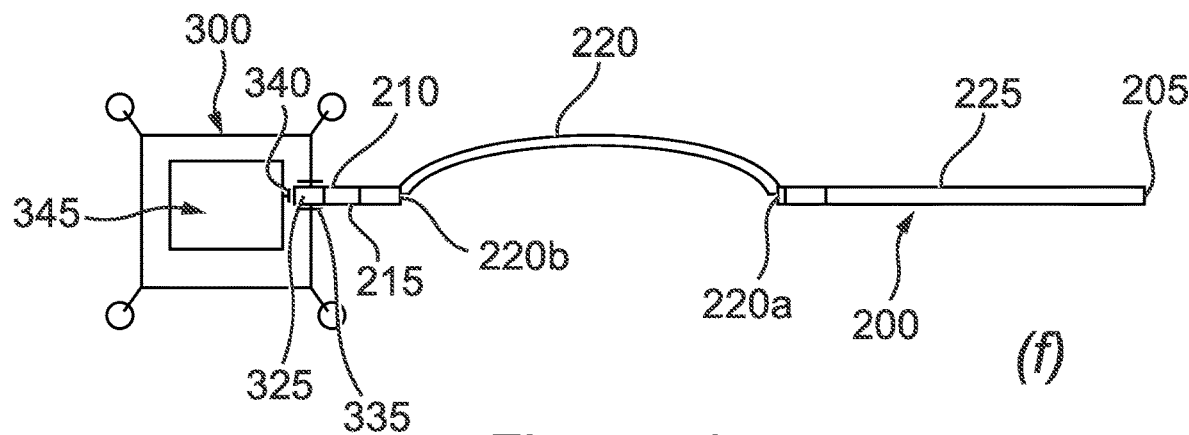
Fig. 5 ctd

DIRECT TIE-IN METHOD

CROSS-REFERENCE TO RELATED APPLICATIONS

The present application is a 35 U.S.C. §§ 371 national phase conversion of PCT/IB2016/001975, filed Dec. 21, 2016, which claims priority to United Kingdom Patent Application No. 1522600.4, filed Dec. 22, 2015, the contents of which are incorporated herein by reference. The PCT International Application was published in the English language.

This invention relates to a method of positioning an end of a pipeline on a subsea structure before this end is connected to subsea equipment such as a manifold for example. This invention also relates to a channel for use in the method, as well as to a subsea structure having an upper surface, the channel being provided on the upper surface.

BACKGROUND

In the field of subsea marine pipelines for transporting fluids, for example hydrocarbons such as oil and gas, it is often necessary to connect an end of a pipeline to subsea equipment such as a manifold or the like, this subsea equipment being installed on a subsea structure such as a platform or a truss structure anchored in the seabed. In relation to the invention, the term "subsea structure" is used to refer to the support, generally mounted on the seabed, upon which subsea equipment (e.g. a manifold) is mounted.

During use, a subsea pipeline can experience large axial forces due to pressure and thermal effects from the circulating fluid. Thus, if a pipeline end is connected directly to subsea equipment (known as direct tie-in), these forces can transfer significant stress to that subsea equipment.

In addition, during the connection (or tie-in) process, significant force is needed to move the pipeline towards the part of the subsea equipment to which it is to be connected. This force is required due to factors such as the stiffness and weight of the pipeline, and friction with the seabed or sea floor.

One known method for trying to address these problems is called spool tie-in. In a spool tie-in method, instead of connecting the pipeline directly to the subsea equipment mounted on the subsea structure, the pipeline end is laid close to the subsea equipment and a short piece of pipe known as a spool (or jumper or tail), which can be rigid or flexible, is provided between an end of the pipeline and the subsea equipment. The spool is designed to accommodate the forces experienced by the pipeline, and thereby reduce the forces on the subsea equipment.

There are two main types of spool. The first type is known as a rigid spool. Rigid spools are normally L-, Z-, M- or U-shaped, and they allow for flexing of the straight parts of the spool relative to each other. In this way, the forces on the subsea equipment can be reduced. Examples of two types of rigid spool are shown in FIG. 1 connected to subsea equipment 1 which is mounted on a subsea structure (not shown). A rigid Z-spool 5 is shown connected at its first end 10 to first tie-in point 20 on subsea equipment 1. Second end 15 of rigid Z-spool 5 is connected to the end of the pipeline 25. A rigid L-spool 30 is shown connected at its first end 35 to second tie-in point 45 on subsea equipment 1. Second end 40 of rigid L-spool 30 is connected to the end of pipeline 50. A disadvantage of rigid spools is that when the pipeline end is laid on the seabed, measurements need to be made (subsea metrology) in order to fabricate a rigid spool piece of the right dimensions for insertion between the subsea equipment and the pipeline end. This takes time and requires the use of installation vessels.

The second main type of spool is a flexible spool (or jumper or tail). A flexible spool generally takes the form of a short flexible pipe which connects the pipeline to the subsea equipment. Flexible spools are more expensive than rigid ones. Examples of two flexible spools are shown in FIG. 2 connected to subsea equipment 1. Flexible spool 55 is shown connected at its first end 60 to first tie-in point 20 on subsea equipment 1. Second end 65 of flexible spool 55 is connected to pipeline 25. Flexible spool 70 is shown connected at its first end 75 to second tie-in point 45 on subsea equipment 1. Second end 80 of flexible spool 70 is connected to pipeline 50.

Since it is generally preferable to use a direct tie-in method rather than a spool tie-in method, various methods have been proposed in order to provide an improved way to achieve a direct tie-in.

One such direct tie-in method is known as "deflect-to-connect". This involves laying a pipeline at a predetermined distance from the subsea equipment to which it is to be attached. The pipeline end is then deflected towards the tie-in point. Difficulties with this method include aligning the pipeline end with the tie-in point, the space required on the seabed, and the level of forces transferred to the tie-in point. An example of a "deflect-to-connect" apparatus is shown in FIG. 3. Pipeline 85 is laid down at a predetermined position relative to subsea equipment 1. Various installation aids such as buoyancy, chains, winches, weights etc . . . (not shown in FIG. 3) are used to pull the first end 90 of pipeline 85 so that it connects to first tie-in point 20 on subsea equipment 1. The dashed line in FIG. 3 shows pipeline 85 in its deflected position, with first end 90 connected to first tie-in point 20 on subsea equipment 1.

Quasi direct tie-in methods are also known, in which the subsea equipment is installed after the pipeline is in position. A tie-in tool is used to move the subsea equipment towards the end of the pipeline so that direct tie-in can be achieved. This method is normally used when the subsea equipment is relatively small and is connected to a flexible riser or rigid spool on its opposite side allowing movement of the subsea equipment within a small area.

In fact, in most of the cases, the subsea equipment is already laid and installed on a subsea structure anchored to a seabed (a gravity based structure for example) before the pipeline to be connected is laid in the sea. However, sometimes it is useful to install only the subsea structure, to lay the pipelines with their ends closer to the subsea structure and to install the subsea equipment on the subsea structure after the pipelines are laid. Then spool tie-in or deflect to connect tie-in can be performed afterwards for each pipeline end to be connected to the subsea equipment.

A more recent development is a method of direct tie-in using residual curvature sections. This method is described in an ISOPE paper (Proceedings of the Twenty-fifth (2015) International Ocean and Polar Engineering Conference, 21-26 Jun. 2015 in Hawaii, "Lay Method to Allow Direct Tie-in of Pipelines" by Nystrom, Endal, Lyngsaunet). It is often used in conjunction with a reel-lay method of laying a pipeline onto a seabed or sea floor. Reel-lay involves the steps of (i) connecting pipe sections onshore, (ii) spooling the resulting pipeline onto a reel on a ship, and (iii) unreeling the pipeline from the ship in order to lay it onto the seabed or sea floor. The pipeline undergoes plastic deformation as it is bent round the reel. As the pipeline is unspooled during laying it is also bent over an aligner before passing through a straightener (normally as series of rollers) and then into the sea.

In the method of direct tie-in using residual curvature sections, the straightener is used to create one or more "prebent" or "understraightened" sections (ie the residual curvature section) in the pipeline. That is, the pipeline undergoes plastic deformation which results in the residual curvature section. These one or more sections are generally created such that there is a short straight section (for example, 50-100 m long) between the residual curvature section and the end of the pipeline which is to be tied-in. The residual curvature section provides a means of absorbing the forces experienced by the pipeline, as well as a reduction in the stress transferred to the subsea structure. An example of a direct tie-in using residual curvature sections is shown in FIG. 4. Pipeline 95 is shown connected at its first end 100 to second tie-in point 45 on subsea equipment 1. Pipeline 95 comprises straight section 105 extending from its first end 100. Straight section 105 is typically 50-100 m long. Extending from straight section 105 is prebent section 110. At the end of prebent section 110 which is opposite to straight section 105 there is further straight section 115. The meaning of straight in this paragraph, and in the context of the invention, is "without residual curvature" (ie without plastic deformation). Of course the straight section could be elastically deformed to have a slight curvature under external load but it has no residual curvature, which means plastic deformation which can be made intentionally during laying. This elastic deformation of the straight section is used in the invention in order to allow the alignment of the pipeline first end with the subsea equipment hub.

The residual curvature section may be fitted with a wire tensioning system. Wire tensioning systems generally comprise a wire with a first end connected close to a first end of the residual curvature section of the pipeline, and a second end connected close to a second end of the residual curvature section. The tension in the wire can then be increased or decreased in order to increase or decrease the bend in the residual curvature section. The wire tensioner can thus be used to move the end of the pipeline such that it can be aligned with the tie-in point on the subsea equipment. FIG. 4 also shows an example of a direct tie-in using residual curvature sections and a wire tensioner. Similar to pipeline 95, pipeline 120 is shown connected at its first end 125 to first tie-in point 20 on subsea equipment 1. Pipeline 120 comprises straight section 130 extending from its first end 125. Straight section 130 is again typically 50-100 m long. Extending from straight section 130 is prebent section 135. A first end 145a of wire tensioner 145 is connected to this end of prebent section 135. At the end of prebent section 135 which is opposite to straight section 130 there is further straight section 140. A second end 145b of wire tensioner 145 is connected to this opposite end of prebent section 135.

Subsea pipelines are generally defined as having a first end (ie the end that is initially unspooled into the sea) and a second end (ie the opposite end of the pipeline, which enters the sea at the end of the unspooling process). Thus, tie-in methods can involve connecting the first end of the pipeline to a subsea equipment (first end tie-in), or connecting the second end of the pipeline to a subsea equipment (second end tie-in).

When utilising the direct tie-in using residual curvature sections method for second end tie-in, the pipeline end may be laid down just short of the subsea equipment to which it is to be connected. The prebent section of the pipeline can be fitted with a wire tensioning system or buoyancy aid to allow the bend in the pipeline to be increased such that the pipeline end can be retracted. After the laying of the second end of the pipeline, the tension in the wire tensioning system (for example) can be increased so that the pipeline end is retracted. This creates sufficient clearance such that the end of the pipeline may then be moved (known as lift and shift) by a vessel crane, various installation aids and by releasing the tension in the wire so that it can be connected to the tie-in point on the subsea equipment. An advantage of such direct tie-in using residual curvature is that the forces exerted by the pipeline (expansion due to pressure and temperature) on the subsea equipment are dampened or mitigated by the residual curvatures located on all the pipeline length. However, such a tie-in requires the intervention of an installation vessel for final tie-in to the subsea equipment.

An improved method of direct tie-in, in particular second end direct tie-in, has been sought.

STATEMENT OF INVENTION

According to one aspect of the invention, there is provided a method of positioning an end of a pipeline on a subsea structure, the method comprising the steps of:
  (a) providing a channel on the subsea structure, the channel having an open end adjacent to a receptacle on the subsea structure,
  (b) providing a pipeline,
  (c) attaching a connector to an end of the pipeline,
  (d) laying the end of the pipeline with the connector attached into the channel, and
  (e) pulling the pipeline end along the channel such that the connector exits the open end of the channel and is received by the receptacle.

According to a second aspect of the invention, there is provided a channel for use in the method described above, wherein the channel is attachable to an upper surface of a subsea structure.

According to a third aspect of the invention, there is provided a method for laying a pipeline on a sea floor from a lay barge and positioning an end of the pipeline on subsea structure, the method comprising the steps of:
  (a) unreeling a pipeline from a pipeline reel into the sea, and
  (b) positioning the end of the pipeline on a subsea structure as described above.

BRIEF DESCRIPTION OF THE DRAWINGS

This invention will be further described by reference to the following Figures which are not intended to limit the scope of the invention claimed, in which:

FIG. 1 shows a prior art rigid spool tie-in,

FIG. 2 shows a prior art flexible spool tie-in,

FIG. 5(a)-(f) shows a plan view of a method of connecting an end of a pipeline to subsea equipment according to an embodiment of the invention.

DETAILED DESCRIPTION

Figure 1:
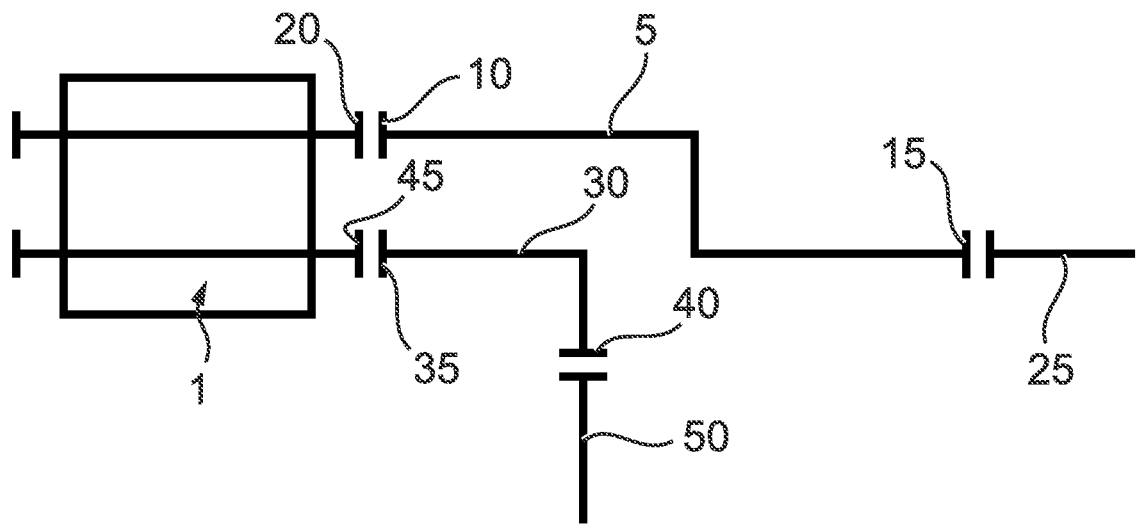
Figure 2:
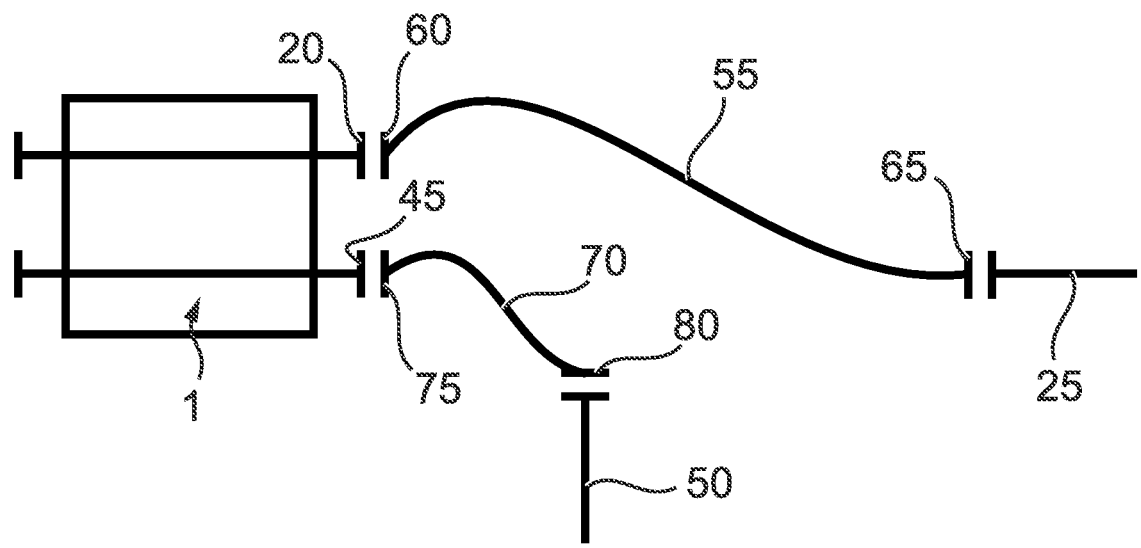
Figure 3:
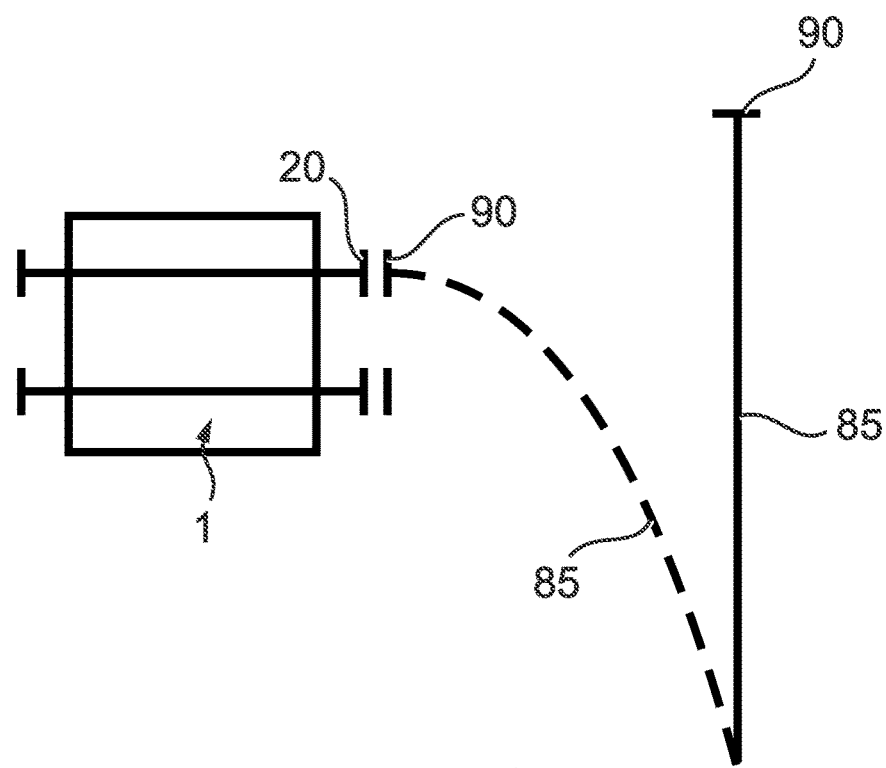
FIG. 3 shows a prior art direct tie-in using "deflect to connect"
Figure 4:
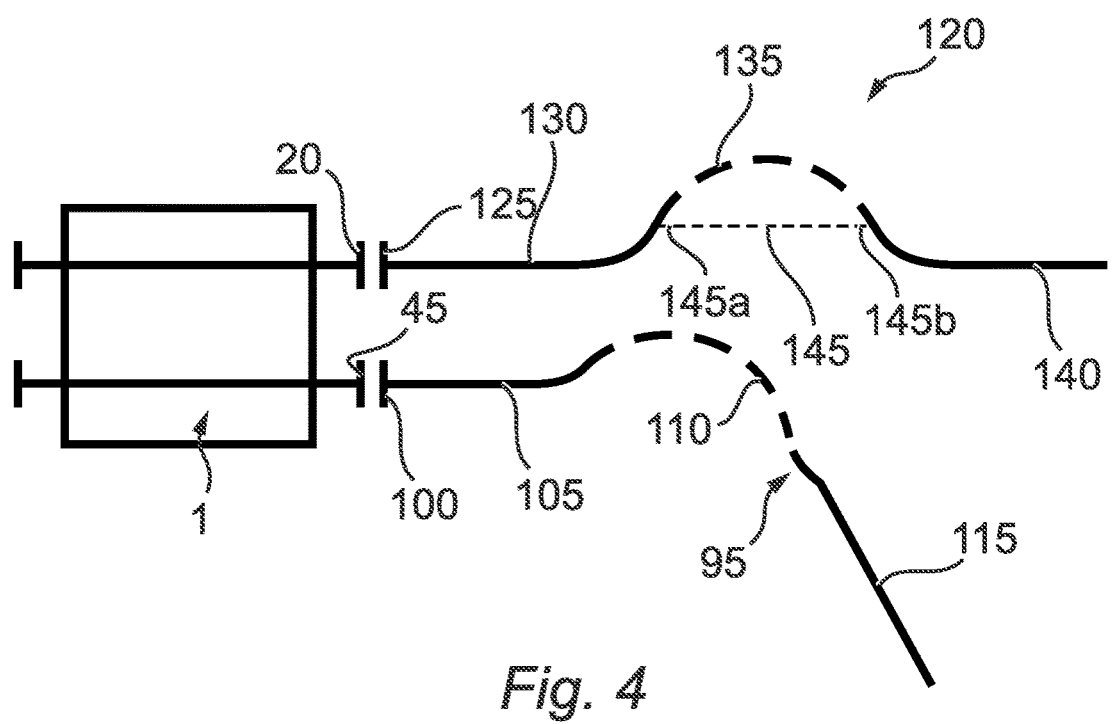
FIG. 4 shows a prior art direct tie-in using residual curvature.

In particular, the pipeline is a subsea pipeline. More particularly, the channel is in the form of a gutter or trough. In particular, the channel is provided on the upper surface of the subsea structure. In the context of the invention, terms such as "top" or "upper" are used to mean the side of the subsea structure which is closest to the surface of the sea, and/or furthest from the sea floor, during use. Similarly, terms such as "bottom" or "lower" are used to mean the side of the subsea structure which is furthest from the surface of the sea, and/or closest to the sea floor, during use.

In relation to the invention, the term "adjacent" is used to mean close enough to the receptacle on the subsea structure to allow the pipeline end to be received by the receptacle when it exits the open end of the channel.

The method of the invention can significantly shorten the length of time needed to lay a pipeline and connect it to subsea equipment. For example, it can allow these steps to be carried out on the same day if the subsea equipment is already installed on the subsea structure, rather than separate days. Or it can allow the pipeline end to be positioned in a receptacle on a subsea structure so that once the subsea equipment is later installed on the subsea structure, the pipeline end is ready for connection to the connection point of the subsea equipment by a simple pull-in/stroke-in operation. In fact, alignment is already made and an easy pull in on a very short distance is all that is needed. The use of vessel installation using a crane to manipulate the pipeline end to bring it to the subsea equipment connection point can therefore be avoided. A ROV (remotely operated vehicle) or an automatic pull-in tool can make the final connection. This can result in a significant cost saving in terms of equipment, vessel time and manpower.

More particularly, in step (e) the pipeline may exit the open end of the channel such that it is received by a support on the subsea structure called the receptacle. In some embodiments, the method may then comprise the steps of removing the channel from the subsea structure and installing subsea equipment such as a manifold on the subsea structure. In particular, the subsea equipment has a connection point which, when installed on the subsea structure, is adjacent to the pipeline end resting on the receptacle of the subsea structure. The pipeline end and the connection point are already aligned, allowing a simple pull-in connection. This alignment between the pipeline end and the connection point of the manifold is made using the channel. The movement of the pipeline end in the channel will help to elastically deform the short straight section in order to ensure that the pipeline end is aligned with the connection point on the manifold for future stroke-in.

More particularly, the pipeline comprises a first end and a second end. The first end is the end which is initially laid into the sea. The second end is the end that enters the sea at the end of the laying process. In particular, the pipeline end referred to above is the second end of the pipeline.

More particularly, the method additionally comprises between steps (b) and (c) the steps of:
(i) laying the pipeline into the channel,
(ii) identifying a location on the pipeline where the pipeline is to be cut, and
(iii) cutting the pipeline.

More particularly, step (i) comprises laying an end of the pipeline into the channel. In particular, the channel is provided with cutting mark. This is to allow measurement of a location on the pipeline where the pipeline is to be cut. Optionally, the measuring step may comprise using a camera mounted on a ROV to measure the distance from the location on the pipeline where the pipeline is to be cut to the pipeline end. This can then allow a connector to be welded to the cut end at the right place. More particularly, the step of cutting the pipeline comprises cutting the pipeline approximately level with or with reference to the cutting mark. The step of laying the pipeline into the channel may be done from a lay barge. The step of cutting the pipeline may comprise retrieving the pipeline to the lay barge and cutting the pipeline on the lay barge (or vessel). In this way, the pipeline can easily be cut to the length required to install a connector in order to provide a good connection to the subsea equipment.

The connector enables the positioning of the pipeline end with its connector in the receptacle on the subsea structure. The connector may comprise a termination head. In particular, a pig launcher/receiver may be provided on the termination head or a pig can be preinstalled within the termination head. The termination head generally comprises a first end which is connected to the pipeline, and a second end which is connected to the pig launcher/receiver. The pig launcher/receiver may be removed from the termination head before the final pull in is done to connect the pipeline end connector to the connection point on the subsea equipment.

More particularly, the pipeline comprises a bent (or curved) section between two straight sections. The bent section may be formed by methods known in the art, such as those described in U.S. Pat. No. 6,910,830. Optionally, the bent section may be provided with one or more buoyancy aids during the method of the invention. The buoyancy aids may be removably attached to the bent section.

In particular, step (b) may comprise providing a wire tensioner on the pipeline. The wire tensioner may comprise a first end connected to a first point on the pipeline, and a second end connected to a second point on the pipeline. A prebent pipeline section can be located entirely or partly between the first and second points. More particularly, the wire tensioner comprises rotating drums. The drums can rotate in order to either wind or unwind the wire in order to move the two points of the pipeline either towards each other or away from one another. Such a rotating drum could be actuated by a ROV for example.

More particularly, step (e) may comprise tensioning the wire tensioner such that the first and second points on the pipeline are moved closer together in order to pull the pipeline end with its connector along the channel.

In particular, the method may additionally comprise the step of:
(f) reducing the tension in the wire tensioner such that the first and second points on the pipeline are moved further apart in order to allow the movement of the pipeline end connector towards the connecting head of the subsea equipment.

Step (f) can be carried out before or after the removal of the channel and installation of the subsea equipment. After the method of positioning has been carried out, as well as optional removal of the channel and installation of the subsea equipment, there may then be an additional step of: (g) connecting the pipeline end connector to the connection point on the subsea equipment. This final connection step can be performed using classical pull-in/stroke-in tools known by the skilled man in the art and operated by ROV for example.

In step (f), it is important to understand that reducing the tension in the wire does not produce movement of the pipeline end which is already positioned in the receptacle. In fact, the pipeline end generally does not move due to factors such as its weight and friction with the sea floor. Instead, it just relieves the tension in the pipeline to provide slack, thereby reducing the forces needed by the stroke-in tool to perform the final stroke-in so that the pipeline end can be connected to the subsea equipment (eg manifold).

In particular, the method of laying the pipeline on a sea floor from a lay barge comprises in step (a), the step of passing the pipeline through a pipeline straightener to form a section of residual curvature (ie a plastically deformed, or bent, section). This is normally formed close to the first end of the pipeline. "Close" in this context generally means within the first kilometre of pipeline adjacent to the pipeline end and optionally within the first 500 meters.

As an alternative, the method of the invention can be performed by using a deflect-to-connect system similar to that described above. In such a method, the pipeline is laid at a predetermined distance from the subsea structure. This is normally done such that the pipeline end then deflected such that it can then be laid into the channel in step (d). The same laying process can be used in step (i) described above in relation to the cutting of the pipeline. The pipeline end may be provided with a curved section, and this deflected/curved section could be slightly moved in order to perform step (e). This could be done either using external aids (crane, winches) or a dedicated preinstalled system. The curved section preferentially represents an angle from 60° to 90°. Using this deflected tie-in, the invention could be used without accounting on a residual curvature of the pipeline meaning without any prebent section.

More particularly, the channel may comprise a substantially flat base and two opposing side walls extending vertically from the base. In particular, each side wall may comprise an upper end, with an angled side wall extending outwardly and upwardly from each upper end. In this context, the term "outwardly" is use to mean horizontally away from the channel. The angled side walls can assist in locating the pipeline in the channel during the step (d) of the method of positioning the pipeline. More particularly, each side wall may each comprise a first side wall extending substantially vertically from the base and having an upper end, a horizontal step extending outwardly from the upper end of each first side wall, the horizontal step having an outward end, and a second side wall extending substantially vertically from each step. In particular, each second side wall may have an upper end, the angled side wall extending outwardly and upwardly from the upper end of each second side wall.

In particular, the channel may comprise an open end through which a pipeline, particularly a pipeline end, may be pulled during the laying of the pipeline. A support (i.e. the receptacle) may be provided on the upper surface of the subsea structure to receive the pipeline, the open end of the channel being proximal to the support. The support may be in the form of a cradle. More particularly, the channel may have two opposing open ends. One of the open ends may be located adjacent to the receptacle on the subsea structure.

In a specific embodiment, the channel could be used to perform a direct tie-in of two different pipelines that are to be connected to the same manifold. For example, the connection points on the manifold could be on opposite sides of it. In that case, the channel has two open ends and extends between the two opposite receptacles of the subsea structure to allow the positioning of two different pipeline ends in those receptacles using each open end as described above. Of course the invention is not limited to the channel specific design and the channel could be modified to be adapted to the subsea structure on which it is to be landed.

Figure 6:
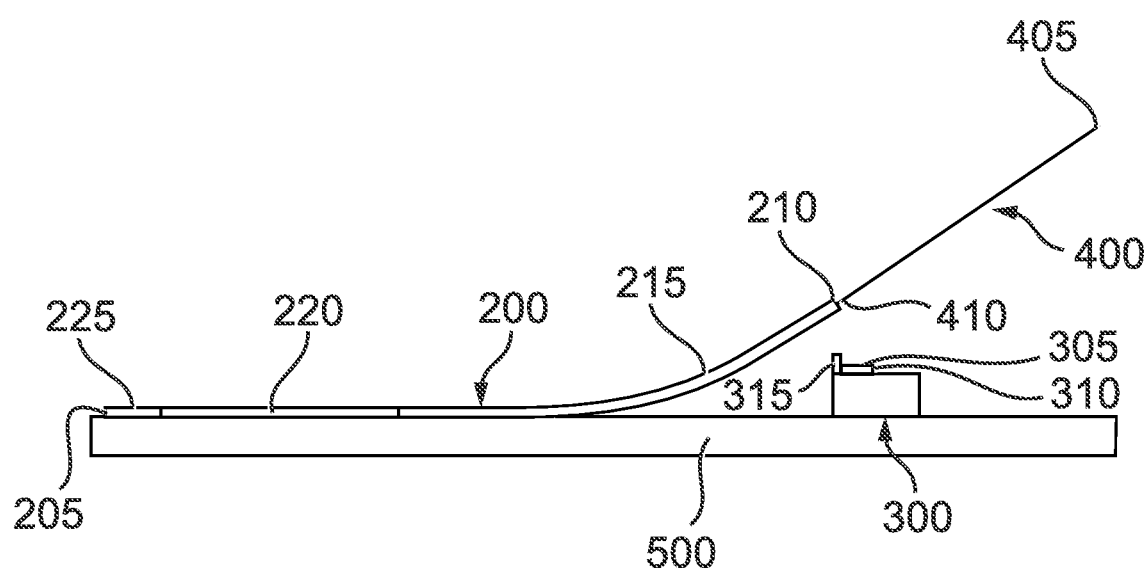
FIG. 6 shows a side view of a pipeline being laid into a channel on a subsea structure in a method according to an embodiment of the invention.

FIG. 6 shows a side view of a method of laying a pipeline 200 from a lay barge (not shown) onto a seabed 500 according to an embodiment of the invention. FIGS. 5(*a*) and 7 then show, in plan and perspective views, the pipeline 200 once it has been laid onto the seabed 500. FIGS. 5(*a*)-(*f*) show a plan view of a method of connecting an end of a pipeline to subsea equipment attached to a subsea structure according to an embodiment of the invention.

As shown in FIGS. 5 and 6, pipeline 200 comprises a first end 205 and a second end 210. As described above, and as shown in FIG. 6, the first end 205 is the end of the pipeline 200 that is initially unspooled into the sea from the lay barge. The second end 210 is the opposite end of the pipeline 200 to the first end 205. The second end 210 enters the sea at the end of the process of unspooling the pipeline 200 from the lay barge.

Figure 7:
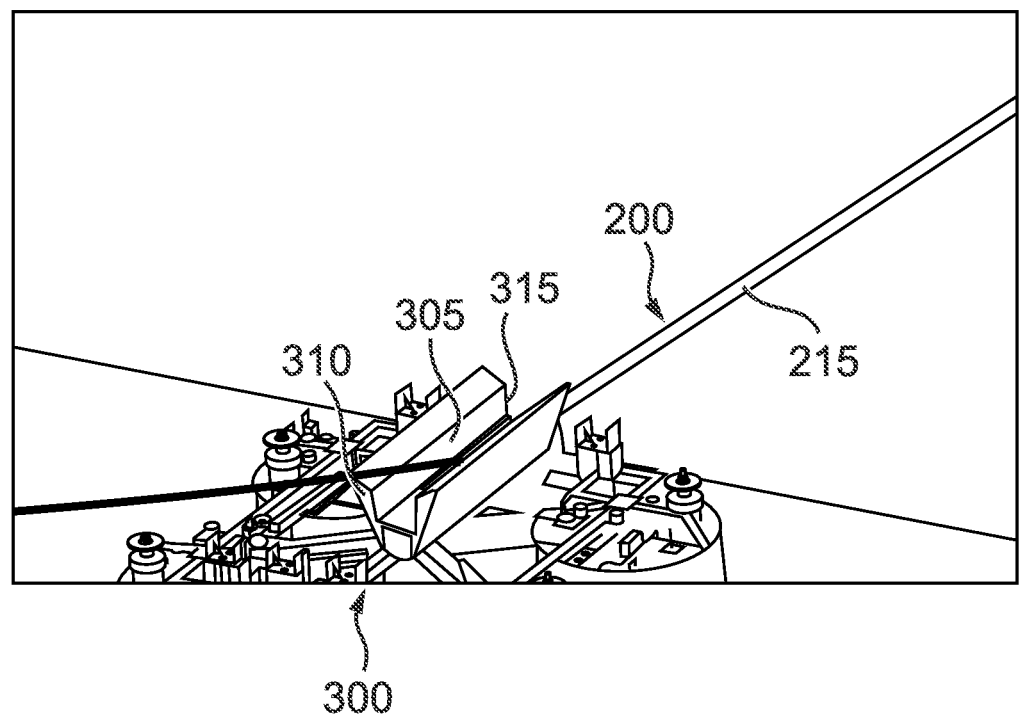
FIG. 7 shows a perspective view of a pipeline laid into a channel on a subsea structure in a method according to an embodiment of the invention.

As shown in FIGS. 5, 6 and 7, pipeline 200 comprises straight section 215 extending from second end 210 (second end 210 not being visible in FIG. 7). Straight section 215 is typically around 100-160 m long. FIGS. 5 and 6 show prebent section 220 extending from straight section 215. Prebent section 220 is typically around 70 m long. As described above and as known in the art, prebent section 220 can be created by using appropriate settings on a pipeline straightener when laying pipeline 200 from the lay barge. At the end of prebent section 220 which is opposite to straight section 215 there is further straight section 225. As shown in FIGS. 5(*a*) and 6, straight section 225 should terminate at first end 205 of pipeline 200. In another configuration not illustrated here, other prebent sections may be introduced along the pipeline length between straight section 225 and the first end 205. As previously noted, straight section means without residual curvature.

At the point of the laying process shown in FIG. 6, first end 205 has already been laid from the lay barge onto seabed 500. The entire pipeline 200 has been unspooled from a reel on the lay barge and the second end 210 of pipeline 200 is being lowered towards sea floor 500 using wire 400. At its first end 405, wire 400 is connected to laying equipment such as a winch which may be situated on the lay barge or on a pipelay vessel. At its second end 410, wire 400 is connected to second end 210 of pipeline 200.

As shown in FIG. 6, a subsea structure 300 has been provided on seabed 500 prior to the laying of pipeline 200. FIGS. 5, 6 and 7 show that a channel 305 is provided on top of subsea structure 300. The term "provided" is used to mean that such a channel 305 is installed on the subsea structure 300 but can also be removed once step (e) has been performed. In this context, terms such as "top" or "upper" are used to mean the side of the subsea structure 300 which is closest to the surface of the sea during use. Channel 305 is in the form of a trough or gutter. Channel 305 has a second end 310 which, in FIGS. 5 and 7, is proximal to the second end 210 of pipeline 200, and a first end 315 which is open with this opening being adjacent to the receptacle of the subsea structure 300. In FIG. 6, second end 210 of pipeline 200 is being laid into channel 305. FIGS. 5(a) and 7 then show the second end 210 of pipeline 200 once laid into channel 305. Channel 305 is also provided with cutting mark 320 (not shown in FIGS. 6 and 7).

As shown in FIG. 5(a), prebent section 220 of pipeline 200 comprises a first end 220a which is closest to the first end 205 of pipeline 200, and a second end 220b which is closest to the second end 210 of pipeline 200. First 220a and second 220b ends of prebent section 220 are connected to each other by a wire tensioner 230. The wire tensioner 230 comprises a rotating drum actuated by a ROV or by any other mean (umbilical, remote control actuators). The connection of the wire on the pipe could be made along the straight section and it is of course not mandatory to connect such a wire at the exact transition between the prebent section and the straight section.

Figure 8:
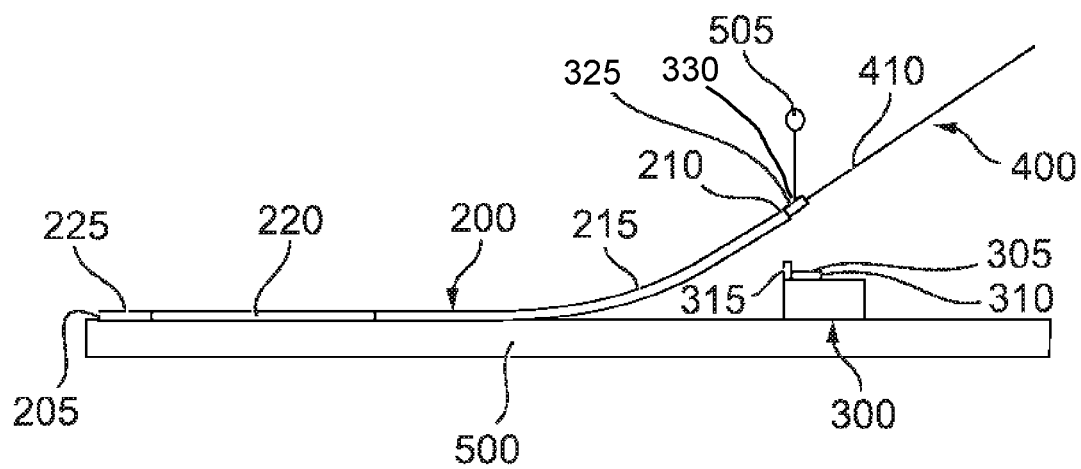
FIG. 8 shows a side view of a pipeline being re-laid into a channel on a subsea structure in a method according to an embodiment of the invention.

Once the pipeline is in the position shown in FIGS. 5(a) and 7, a measurement is taken using the cutting mark 320 of the channel 305 to identify a location on the pipeline where the pipeline is to be cut. Then the pipeline is retrieved to the deck of an assisting vessel (the pipelay vessel or another one). The pipeline 200 is then cut at the identified location, in a direction substantially perpendicular to the longitudinal axis of the pipeline 200. The second end 210 of pipeline 200 is then fitted with a connector in the form of a termination head 325. At the opposite end the termination head 325 may eventually be equipped with a pig launcher 330. The second end 210 of pipeline 200 is then re-laid into channel 305 provided on top of subsea structure 300. A side-on view of the re-laying step is shown in FIG. 8. FIG. 8 is identical to FIG. 6, except that termination head 325 and pig launcher/receiver 330 (indicated for illustrative purposes as one part 325/330) are shown fitted to second end 210 of pipeline 200. In addition, buoy 505 is attached to the termination head 325 and pig launcher/receiver 330 in order to control the descent of these components.

Figure 9:
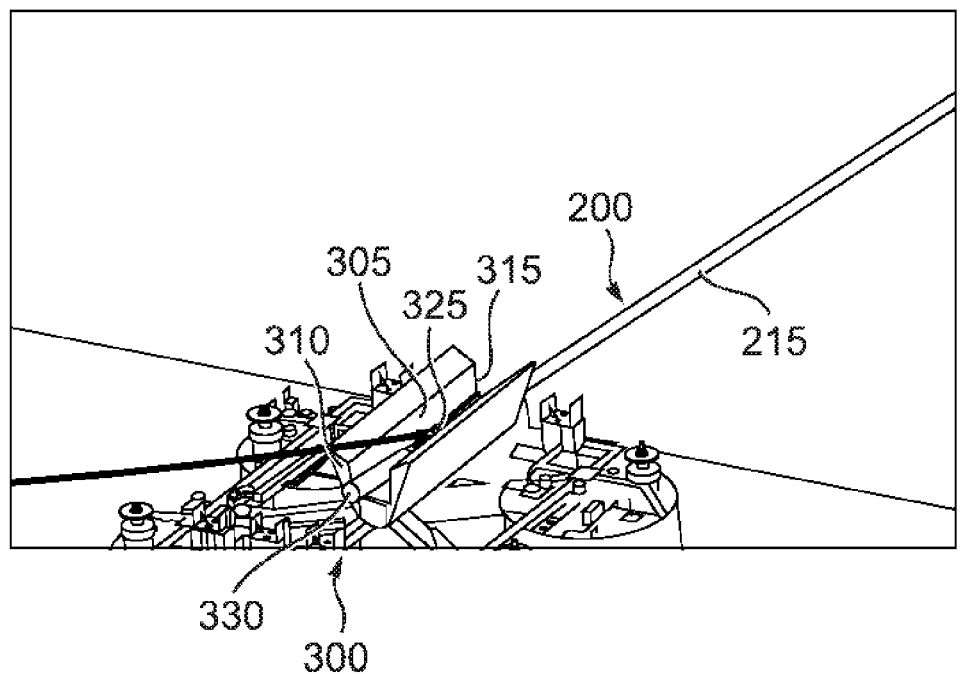
FIG. 9 shows a perspective view of a pipeline re-laid into a channel on a subsea structure in a method according to an embodiment of the invention.
Figure 10:
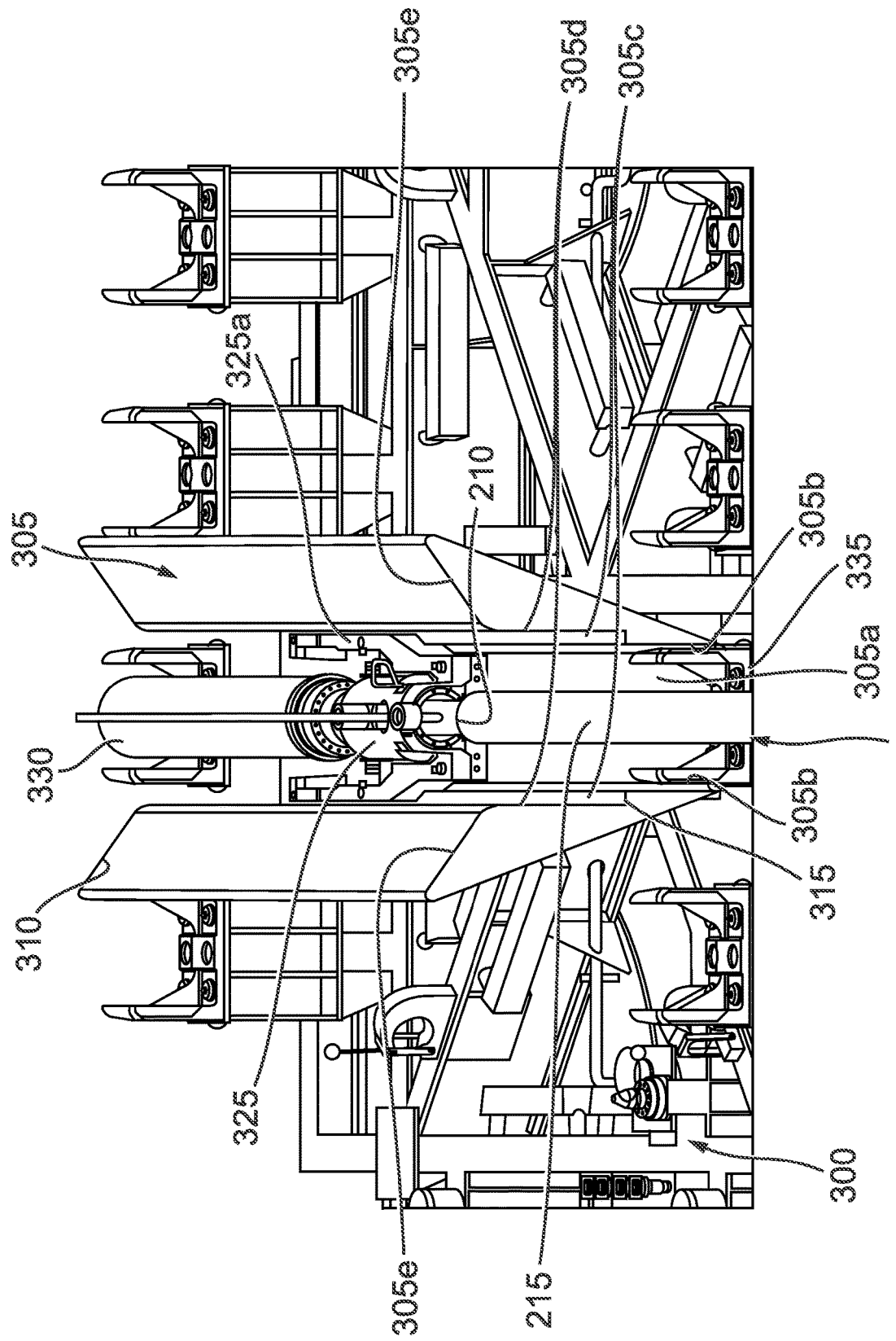
FIG. 10 shows a close-up view of a pipeline re-laid into a channel on a subsea structure in a method according to an embodiment of the invention.

FIGS. 5(b), 9 and 10 show, in plan and two perspective views respectively, the pipeline 200 once it has been re-laid into channel 305, with termination head 325 fitted to the cut second end 210 (not visible in FIG. 9) of pipeline 200 and pig launcher/receiver 330 fitted to the opposite end of termination head 325 from second end 210.

As show in detail in FIG. 10, channel 305 is generally u-shaped. At its lowermost point (i.e. the point furthest from the surface of the sea during use), channel 305 has horizontal base 305a which is rectangular in shape. Extending vertically from the two long sides of the rectangle formed by the base 305a are two opposing first walls 305b. At the upper ends of the two first walls 305b the channel widens via two outwardly extending opposing horizontal steps 305c, one step 305c being provided at the upper end of each first wall 305b. Two vertical opposing second walls 305d then extend vertically from steps 305c, each second wall 305d being provided the opposite end of each step 305c from each first wall 305b. In this way, steps 305c form runners. Termination head 325 is provided with side arms 325a which are adapted to slide along the runners formed by steps 305c.

However, the global shape of the channel 305 could be different. In particular, the sectional shape could vary (U, V, a U with some inclined upper wall, . . . ). The shape should be adapted to the geometrical constraints of the subsea structure on which the pipeline end is to be positioned for connection.

At the upper end of the two second walls 305d the channel 305 widens via two angled walls 305e, which are angled at around 45° outwards from second walls 305d. Channel 305 then terminates at the upper end of angled walls 305e. The angled walls 305e assist in locating the second end 210 of pipeline 200 into channel 305. For simplicity, parts 305a-305e are not labelled in FIG. 11-14.

Also shown in FIG. 10 is cradle 335 on subsea structure 300. Cradle 335 is substantially u-shaped such that it will accept pipeline 200 and is provided at first end 315 of channel 305. Cradle 335 is positioned so that the lowest part of its u-shape is substantially aligned with base 305a and the side walls of its u-shape are substantially aligned with first walls 305b of channel 305. The cradle 335 is the receptacle of the subsea structure.

Figure 11:
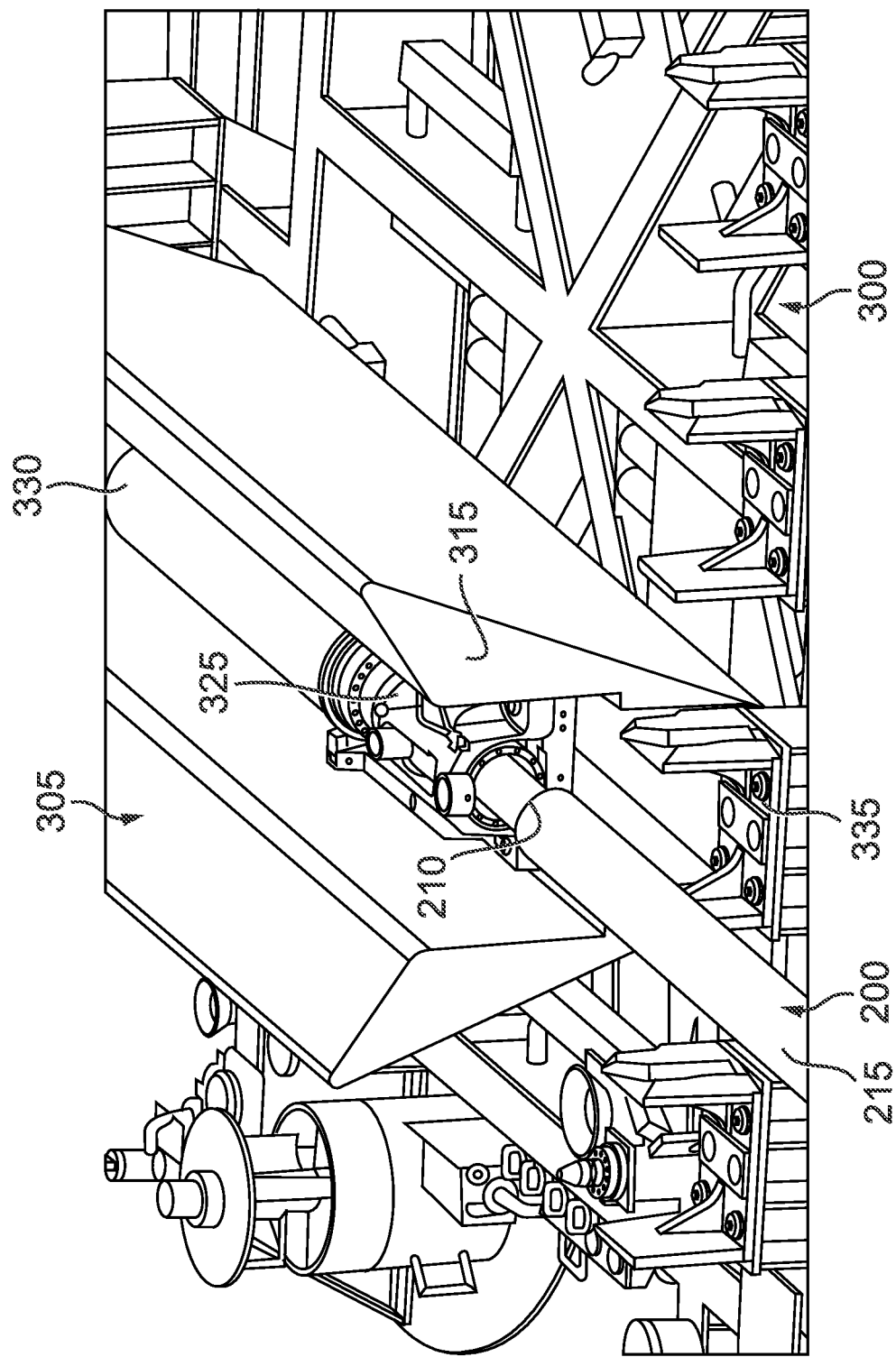
FIGS. 11-14 show the pipeline being pulled along and exiting a channel on a subsea structure in a method according to an embodiment of the invention.
Figure 12:
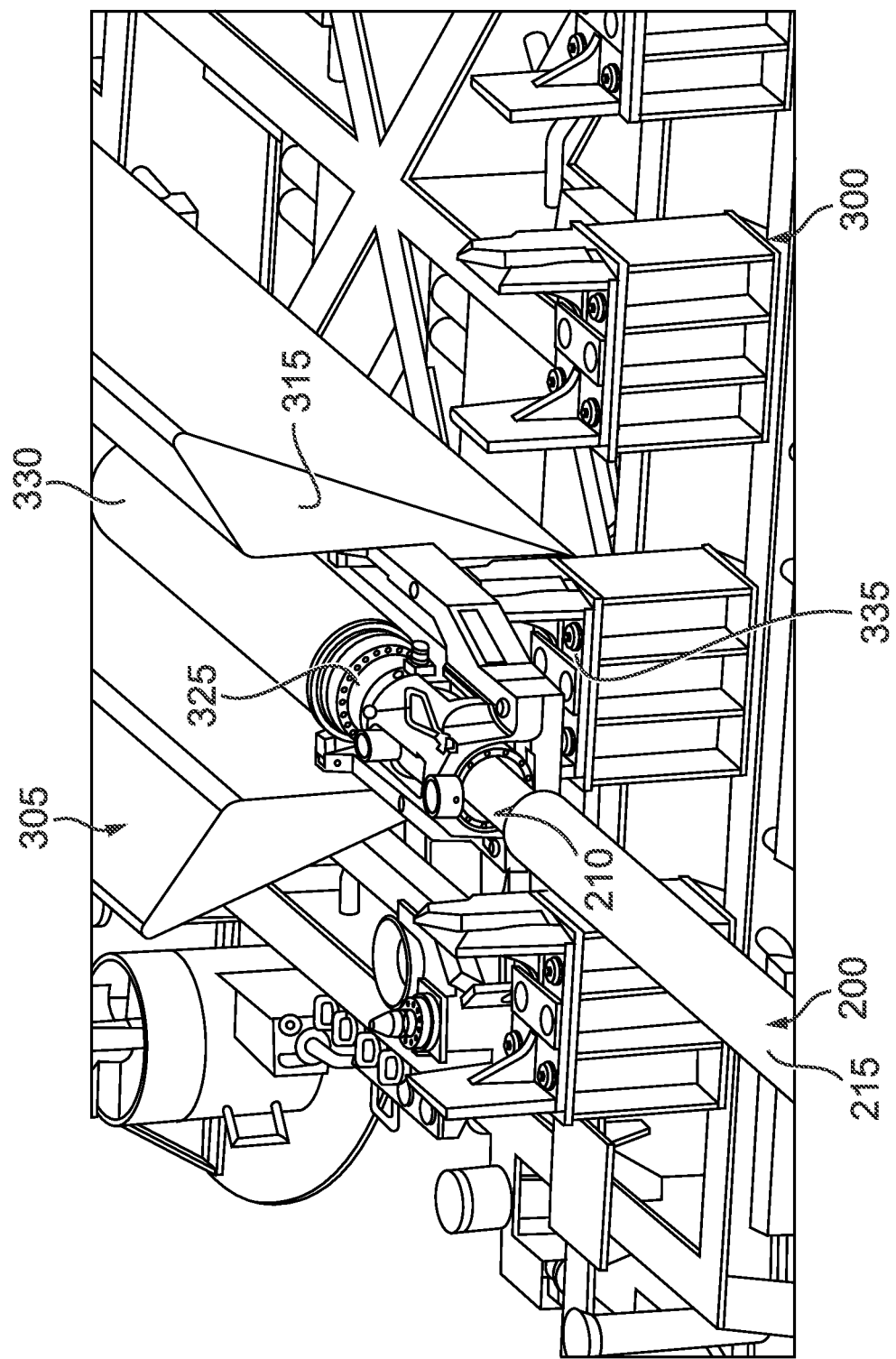

FIG. 5(c) depicts the next stage in the method, in which wire tensioner 230 is tensioned. The direction of the tensioning force is indicated in FIG. 5(c) by the arrows pointing to the letter "T". The tensioning of wire tensioner 230 pulls first 220a and second 220b ends of prebent section 220 of pipeline 200 towards each other. This results in the second end 210 of pipeline 200, and the attached termination head 325 and pig launcher/receiver 330, being pulled along channel 305 towards the first end 315 of the channel 305. This movement is continued until termination head 325 is pulled entirely from channel 305 through first end 315. The stages of this movement are shown in perspective view in FIGS. 11 and 12. FIG. 11 shows the termination head 325 and pig launcher/receiver 330 having moved part of the way along channel 305 towards first end 315. In FIG. 12 the termination head 325 is shown at the point of exiting the first end 315 of channel 305.

Figure 13:
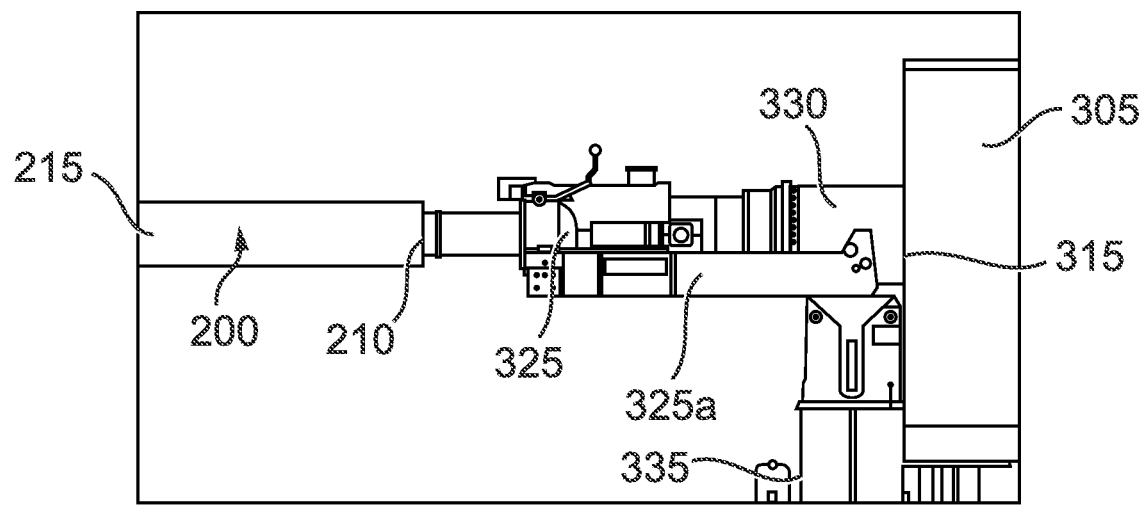
Figure 14:
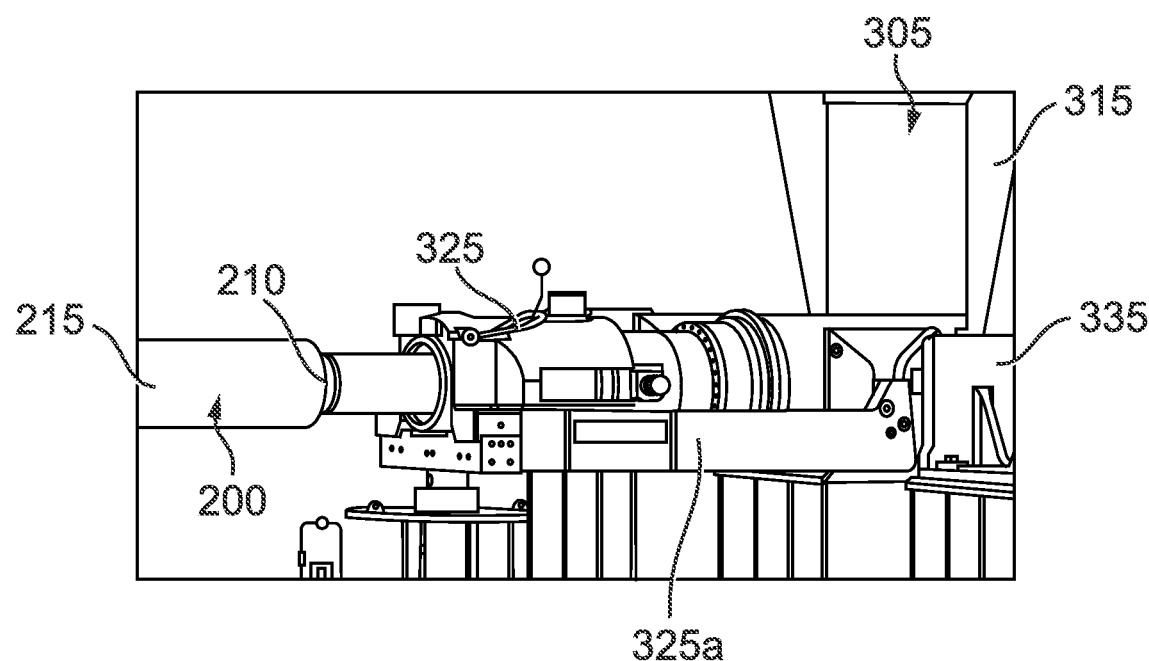

A side view after further movement of the pipeline 200 in this direction is shown in FIG. 13. In this view, termination head 325 has completely exited channel 305 through open first end 315. In addition, side arms 325a of termination head 325 have also just exited channel 305. Since these side arms 325a are no longer resting on steps 305c on channel 305, FIG. 13 shows the point at which pipeline 200 is able to fall into cradle 335. FIG. 14 then shows in perspective view the pipeline after it has dropped into a receptacle of the subsea structure in the form of a cradle 335.

When exiting the channel 305, it is possible to help the termination head 325 to fall in the cradle 335. For that, the arms 325a must have sufficient loads (i.e. weight) to fall in the cradle 335 when exiting the channel 305. Alternatively, the termination head 325 or the part of the pipeline 200 adjacent to the termination head 325 could be lifted (using crane, wire or buoyancy) to ensure that the arms 325a will fall in the cradle 335.

In the next stage in the method is shown in FIG. 5(d). The channel 305 has been removed from the top of subsea structure 300 and replaced with subsea equipment which is installed on the subsea structure 300. This subsea equipment is here illustrated in the form of a manifold 345. The manifold 345 is installed on the subsea structure 300 using an installation vessel with a crane or the like (not shown). The orientation of the manifold 345 on the subsea structure 300 is imposed by guiding means (not shown) having complementary shape between the subsea equipment and the subsea structure 300. Such an installation known in the art leads to the manifold 345 being installed with its connection point 340 positioned near the cradle 335 on the subsea structure 300. The cradle 335 holds the termination head 325 close to the connection point 340. The wire tensioner 230 remains tensioned during this stage.

As shown in FIG. 5(e), the next stage of the method involves the tension in the wire tensioner 230 being incrementally or fully released. This causes the first 220a and second 220b ends of prebent section 220 of pipeline 200 to move apart from each other (indicated by the arrows in FIG. 5(e)) giving some slack in the pipeline straight section 215.

An optional non-illustrated step consists in installing a pulling tool between the cradle 335 and the connecting head 340 of the manifold so as to perform the final pull-in and connection of the pipeline connector 325 to the manifold 345 connection point 340. This step is well known in the art and called final pull-in or stroke-in and is performed using jack actuated by remote controls or by an ROV. Some cleaning tools could be also used during this step to ensure proper seal of the connection.

As a result of this movement, the termination head 325 moves towards connection point 340 on manifold 345. The termination head 325 is thus close enough to be connected (or tied-in) to the connection point 340 on manifold 345.

Finally, as shown in FIG. 5(f), once the connection between termination head 325 and connection point 340 has been made, the wire tensioner is removed from prebent section 220 of pipeline 200.

This method can contemplate the connection of a plurality of pipeline ends to a plurality of subsea equipment connection points using the same channel 305 on several locations of a subsea structure 300. Once all the pipeline ends with their connectors are placed within their respective cradles 335 then the subsea equipment can be installed on the subsea structure 300 and all the final stroke-in steps performed in a classical way.

The invention claimed is:

1. A method of positioning an end of a pipeline on a subsea structure, the method comprising the steps of:
    (a) providing a channel on the subsea structure, the channel having an open end adjacent to a receptacle on the subsea structure,
    (b) providing the pipeline,
    (c) attaching a connector to the end of the pipeline,
    (d) laying the end of the pipeline and the connector attached to the end of the pipeline into the channel, and a portion of the pipeline that is spaced from the connector in the receptacle that is adjacent the open end of the channel, and
    (e) pulling the pipeline end and the connector attached to the end of the pipeline along and inside the channel such that the pipeline end and the connector attached to the end of the pipeline are retracted toward the receptacle, and the connector exits the open end of the channel and is received by the receptacle,
    wherein the pipeline comprises a prebent section between two straight sections,
    wherein step (b) comprises providing a wire tensioner on the pipeline, the wire tensioner comprising a first end connected to a first point on the pipeline, and a second end connected to a second point on the pipeline, the prebent pipeline section being located entirely or partly between the first and the second points on the pipeline, and
    wherein step (e) comprises tensioning the wire tensioner such that the first and the second points on the pipeline are moved closer together in order to pull the pipeline end along the channel.

2. The method as claimed in claim 1, additionally comprising between steps (b) and (c) the steps of:
    (i) laying the pipeline into the channel,
    (ii) identifying a location on the pipeline where the pipeline is to be cut, and
    (iii) cutting the pipeline.

3. The method as claimed in claim 2, wherein the channel is provided with a cutting mark, and wherein step (ii) comprises cutting the pipeline approximately level with or with reference to the cutting mark.

4. The method as claimed in claim 1, wherein the method additionally comprises the step of:
    connecting the connector on the end of the pipeline to the connection point on the subsea equipment.

5. A method for laying a pipeline on a sea floor from a lay barge and positioning an end of the pipeline on a subsea structure, the method comprising the steps of:
    (a) unreeling the pipeline from a pipeline reel into the sea, and
    (b) positioning the end of the pipeline on the subsea structure as claimed in claim 1.

* * * * *